US 6,601,141 B2
Jul. 29, 2003

(12) United States Patent
Ooishi

(54) SEMICONDUCTOR MEMORY DEVICE HAVING CACHE FUNCTION

(75) Inventor: Tsukasa Ooishi, Hyogo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 235 days.

(21) Appl. No.: 09/848,410

(22) Filed: May 4, 2001

(65) Prior Publication Data

US 2001/0029572 A1 Oct. 11, 2001

Related U.S. Application Data

(60) Continuation of application No. 09/271,172, filed on Mar. 18, 1999, now Pat. No. 6,256,707, which is a division of application No. 08/602,895, filed on Feb. 16, 1996, now Pat. No. 5,943,681.

(30) Foreign Application Priority Data

Jul. 3, 1995 (JP) .............................. 7-167604

(51) Int. Cl.⁷ .............................. G06F 12/08
(52) U.S. Cl. ................. 711/117; 711/118; 710/52; 713/400; 713/401
(58) Field of Search .............. 711/117, 118; 710/52; 713/400, 401

(56) References Cited

U.S. PATENT DOCUMENTS

| | | |
|---|---|---|
| 4,494,190 A | 1/1985 | Peters |
| 4,841,513 A | 6/1989 | Farhangi et al. |
| 4,858,188 A | 8/1989 | Kobayashi |
| 5,226,139 A | 7/1993 | Fujishima et al. |
| 5,249,165 A | 9/1993 | Toda |
| 5,261,066 A | 11/1993 | Jouppi et al. |
| 5,285,323 A | 2/1994 | Hetherington et al. |
| 5,305,280 A | 4/1994 | Hayano |
| 5,359,568 A | 10/1994 | Livay et al. |
| 5,359,722 A | 10/1994 | Chan et al. |
| 5,386,547 A | 1/1995 | Jouppi |
| 5,420,994 A | 5/1995 | King et al. |
| 5,481,749 A | 1/1996 | Grondalski |
| 5,491,811 A | 2/1996 | Arimilli et al. |
| 5,509,132 A | 4/1996 | Matsuda et al. |
| 5,611,068 A | 3/1997 | Giangarra et al. |
| 5,619,676 A | 4/1997 | Fukuda et al. |
| 5,696,940 A | 12/1997 | Liu et al. |
| 5,860,160 A | 1/1999 | Narayana et al. |
| 5,913,229 A | 6/1999 | Joo |

OTHER PUBLICATIONS

"The Cache Memory Book", by Handy, ISBN 0–12–322985–5 (1993), pp. 73–84.
"A 100–Mhz 4–Mb Cache DRAM with Fast Copy–Back Scheme", by Dosaka, IEEE Journal of Solid State Circuits, vol. 27, No. 11 (Nov. 1992), pp. 15341539.
"A Circuit Design of Intelligent DCRAM with Automatic Write Back Capability", by Arimoto, 1990 Symposium on VLSI Circuits, IEEE document CH2885–2/90/000/0079, 1990.
"The Cache DRAM Architecture: A DRAM with an On–Chip Cache Memory", by Hidaka, IEEE Micro (Apr. 1990), pp. 14–25, IEEE Document0272–1732/90/0400–001, 1990.
"A Current Operating CDRAM for Low Cost Multi–Media", by Yamazaki et al., pp. 61–62.

Primary Examiner—Hiep T. Nguyen
(74) Attorney, Agent, or Firm—McDermott, Will & Emery

(57) ABSTRACT

A cache DRAM includes a main memory, a main cache memory for storing data which is accessed at a high frequency out of data stored in the main memory, a main tag memory for storing an address in the main memory of the data stored in the main cache memory, a subcache memory for always receiving data withdrawn from the main cache memory for storage and supplying the stored data to the main memory when the main memory is in a ready state, and a subtag memory for storing an address in the main memory of the data stored in the subcache memory. Since the subcache memory serves as a buffer for data to be transferred from the main cache memory to the main memory, the main cache memory withdraws data to the subcache memory even if the main memory is in a busy state.

8 Claims, 19 Drawing Sheets

SEMICONDUCTOR MEMORY DEVICE HAVING CACHE FUNCTION

This application is a Continuation of application Ser. No. 09/271,172 filed Mar. 18, 1999, now U.S. Pat. No. 6,256,707 which is a Divisional of application Ser. No. 08/602,895 filed Feb. 16, 1996 and now U.S. Pat. No. 5,943,681.

BACKGROUND OF THE INVENTION

1. Field of the Invention

The present invention relates to semiconductor memory devices, and more particularly, to an improvement of a cache DRAM (Dynamic Random Access Memory).

2. Description of the Background Art

FIG. 20 is a concept diagram showing a structure of a conventional cache DRAM. Referring to FIG. 20, a cache DRAM 1900 includes a main memory 101 storing a large amount of data required for an MPU (Main Processing Unit), and a cache memory 103 storing a part of the data. Generally, a DRAM is used for main memory 101, and an SRAM (Static Random Access Memory) is used for cache memory 103. These memories 101 and 103 are formed on one chip.

The MPU is connected to main memory 101 through cache memory 103. Almost all data required for the MPU is stored in main memory 101. Out of the data, data which is accessed at a high frequency is stored in cache memory 103, thereby preventing the operation speed of the MPU from being determined by an access time to main memory 101. More specifically, since the access speed of the DRAM configuring main memory 101 is lower than the operation speed of the MPU, if the MPU directly accesses main memory 101, the MPU must wait for reading or writing of the DRAM to complete during several cycles. On the other hand, the access speed of the SRAM configuring cache memory 103 is higher than that of the DRAM. Therefore, since data which is accessed at a high frequency is stored in cache memory 103 in this cache DRAM, substantial reduction of the operation speed of the MPU is prevented.

FIG. 21 is a block diagram showing a specific structure of the cache DRAM of FIG. 20. Referring to FIG. 21, cache DRAM 1900 includes main memory 101, cache memory 103, a data buffer 203 for inputting/outputting data Din/Dout, a CS buffer 205 for receiving a chip select signal CS, an address buffer 201 for receiving an address signal Add, a tag memory 207 for storing an address in the main memory of data stored in cache memory 103, a synchronous arbiter 115 for controlling access to main memory 101, a refresh controller 211 for controlling refresh of main memory 101, and a clock generating circuit 213 for generating a clock signal for controlling refresh controller 211.

Data which is accessed at a high frequency out of the data stored in main memory 101 is also stored in cache memory 103. The address in main memory 101 of the data stored in cache memory 103 is stored in tag memory 207. Tag memory 207 is also called a content addressable memory (CAM). Data buffer 203 serves as an interface for cache memory 103. In response to chip select signal CS, data buffer 203, address buffer 201, cache memory 103, and tag memory 207 are activated. When an externally supplied address matches the address stored in tag memory 207, data in cache memory 103 is accessed. Such a case is called a hit. On the other hand, when an externally supplied address does not match the address stored in tag memory 207, data in main memory 101 is accessed. This case is called a miss.

Since the storage capacity of cache memory 103 is limited, data whose access frequency is decreased must be transferred to main memory 101. In this case, the data is transferred to main memory 101 according to the address corresponding to the data stored in tag memory 207. Simultaneously with such data transfer from cache memory 103 to main memory 101, an address for refreshing main memory 101 is sometimes transferred from refresh controller 211. Synchronous arbiter 115 is provided for avoiding such a contention of access to main memory 101. While main memory 101 is refreshed, data transfer from cache memory 103 or data buffer 203 to main memory 101, or data transfer from main memory 101 to cache memory 103 or data buffer 203 is suppressed. When refresh is completed, the above described data transfer is started.

As described above, the transfer operation between units such as main memory 101, cache memory 103, and refresh controller 211 is carried out synchronously in response to an externally supplied clock signal. Therefore, while refresh controller 211 refreshes main memory 101, cache memory 103 must refrain data transfer to main memory 101. Since the MPU cannot access cache memory 103 during this period, the operation speed of the MPU is restricted.

SUMMARY OF THE INVENTION

One object of the present invention is to provide a semiconductor memory device capable of performing data transfer from a cache memory to a main memory smoothly by shortening a wait time caused by a contention between data transfer and refresh.

According to one aspect of the present invention, a semiconductor memory device includes a main memory, a cache memory and a buffer memory. The main memory stores data. The cache memory is coupled to the main memory, and stores the same data as some of the data stored in the main memory. The buffer memory is coupled to the main memory and the cache memory. The buffer memory always receives data withdrawn from the cache memory for storage, and supplies the stored data to the main memory when the main memory is in a ready state. Here, the buffer memory preferably includes a shift register having a plurality of register elements.

Therefore, according to the present invention, data is transferred from the cache memory to, the buffer memory even when the main memory is in a busy state. The main advantage of the present invention is to shorten a wait time of the cache memory, resulting in increase in a substantial operation speed of the MPU.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
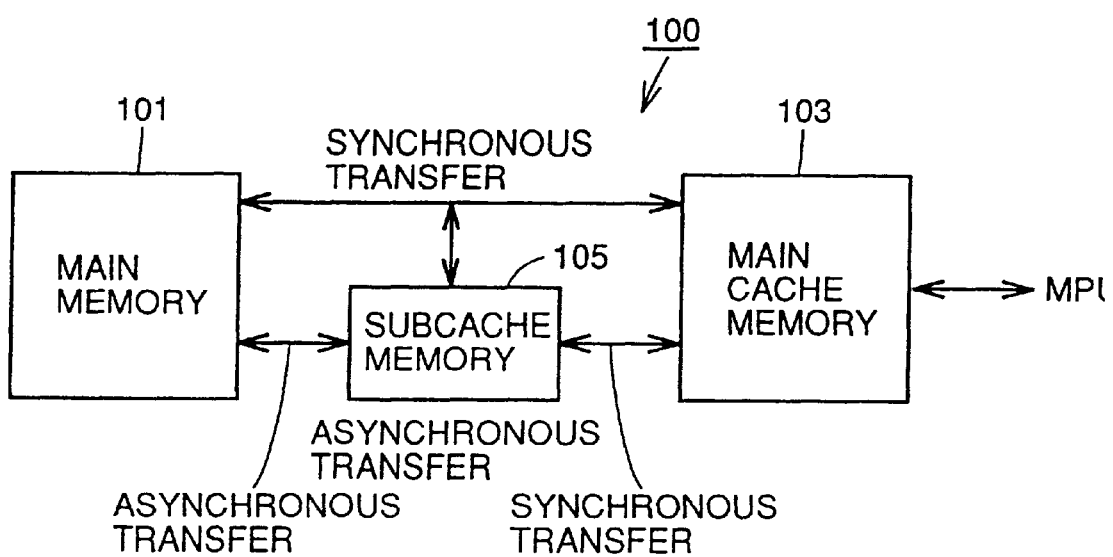
FIG. 1 is a concept diagram showing a structure of a cache DRAM according to a first embodiment of the present invention.

Embodiments of the present invention will be described hereinafter in detail with reference to the drawings. Note that the same reference characters denote the same or corresponding portions in the drawings.

(1) First Embodiment

Referring to FIG. 1, a cache DRAM 100 includes a main memory 101, a main cache memory 103, and a subcache memory 105. Main cache memory 103 is connected to main memory 101 and subcache memory 105. Main memory 101 is also connected to subcache memory 105. Main memory 101 stores almost all data required for an MPU. Main cache memory 103 stores data which is accessed at a high frequency out of the data stored in main memory 101. Subcache memory 105 serves as a data transfer buffer from main cache memory 103 to main memory 101. More specifically, subcache memory 105 always receives data withdrawn from main cache memory 103 for storage, and supplies the stored data in main memory 101 when main memory 101 is in a ready state.

Main cache memory 103 operates similarly to subcache memory 105. When an externally supplied address matches an address registered in main cache memory 103 or subcache memory 105, main cache memory 103 or subcache memory 105 is accessed without main memory 101 being accessed. As a result, a high speed data reading/writing operation can be carried out.

When data in subcache memory 105 is accessed, the data is transferred from subcache memory 105 to main cache memory 103. On the other hand, data in main cache memory 103 which is not accessed for a long time is transferred from main cache memory 103 to subcache memory 105. When the data transferred to subcache memory 105 is again accessed, the data is retransferred from subcache memory 105 to main cache memory 103. However, when the data transferred to subcache memory 105 is not accessed for a predetermined time again, the data is transferred from subcache memory 105 to main memory 101. While data is transferred synchronously between main memory 101 and main cache memory 103, and between main cache memory 103 and subcache memory 105, data is transferred asynchronously between main memory 101 and subcache memory 105. More specifically, the transfer operation between main memory 101 and subcache memory 105 is carried out not in response to an externally supplied control signal or an internally generated control signal, but in response to an asynchronously generated control signal. Therefore, the transfer operation from subcache memory 105 to main memory 101 is not in synchronism with the other transfer operation and the refresh operation.

Figure 2:
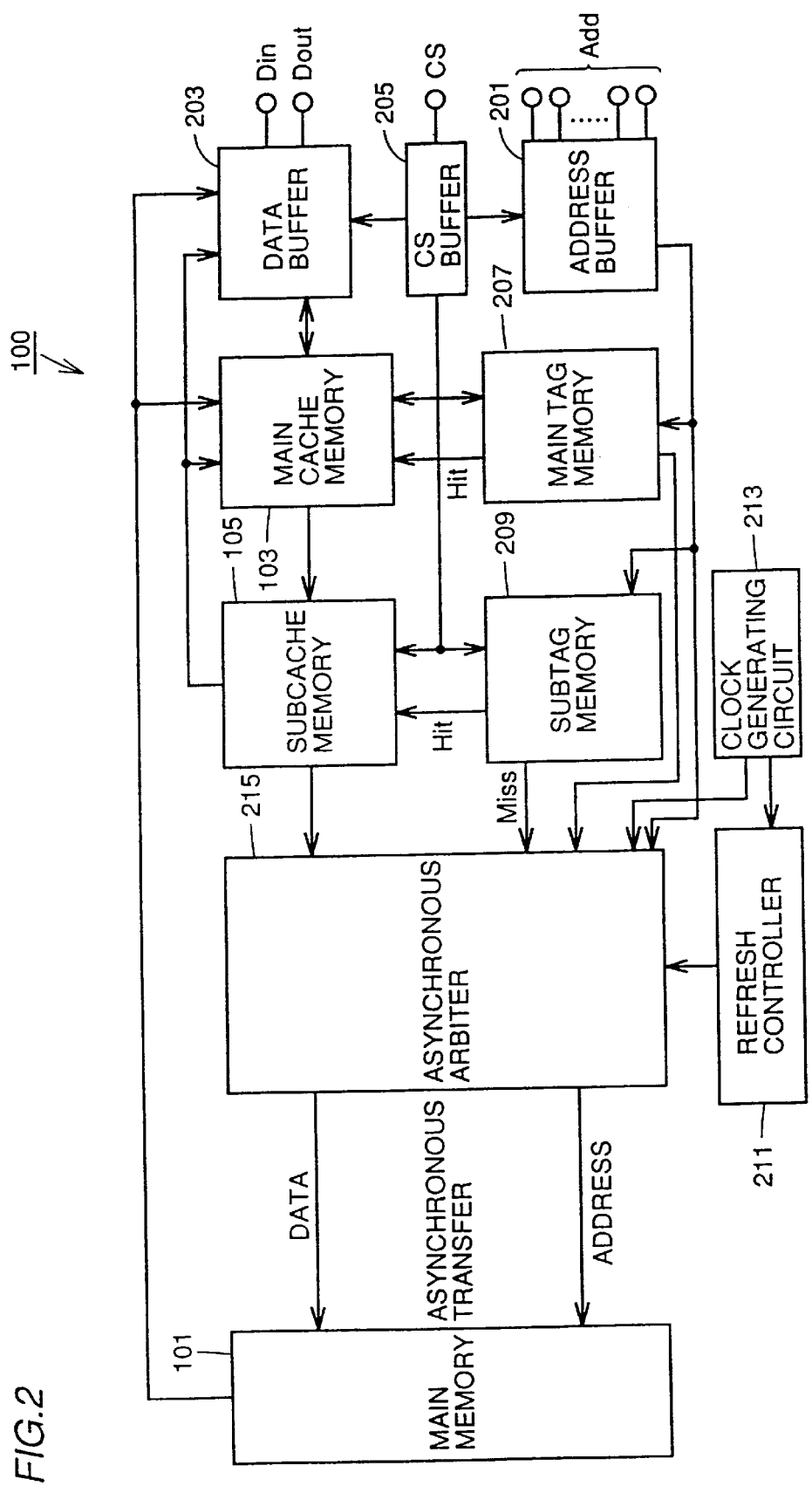
FIG. 2 is a block diagram showing a specific structure of the cache DRAM of FIG. 1.

Referring to FIG. 2, cache DRAM 100 includes main memory 101, main cache memory 103, an address buffer 201 for receiving an externally supplied address signal Add, a data buffer 203 for inputting/outputting data Din/Dout, a CS buffer 205 for receiving chip select signal CS, a main tag memory (content addressable memory; CAM) 207 for storing an address in main memory 101 of data stored in main cache memory 103, a subtag memory (CAM) 209 for storing an address in main memory 101 of data stored in subcache memory 105, a refresh controller 211 for controlling refresh of main memory 101, a clock generating circuit 213 for generating a clock signal for controlling refresh controller 211, and an asynchronous arbiter 215 for determining priority when there is a contention in access to main memory 101. At the time of power-on, main tag memory 207 and subtag memory 209 are reset.

Referring to FIG. 2, in order to cache data, data itself and an address indicating a storage position of the data must be recognized. Therefore, an address is stored in tag memories 207 and 209. An externally supplied address is compared to the address in tag memories 207 and 209 in response to chip select signal CS. If they match, data in main cache memory 103 or subcache memory 105 corresponding to the address in tag memory 207 or 209 is accessed. In main cache memory 103 and subcache memory 105, such comparing operation and access operation are carried out. Comparison of addresses is simultaneously carried out in main cache memory 103 and subcache memory 105. This is because data existing in main cache memory 103 and subcache memory 105 always have different addresses. Accordingly, a difference in time required for data output between access of main cache memory 103 and access of subcache memory 105 becomes extremely small.

Tag memories 207 and 209 used for comparison of addresses are set to one word (the number of bits per one word depends on the specification), respectively. When the result of comparison of addresses is a hit, the corresponding word line is activated. When the result of comparison of addresses is a miss, a miss signal is output from main cache memory 103 and subcache memory 105.

When necessary data is stored in main cache memory 103, the data is kept in main cache memory 103, and read out therefrom. In the write operation, the data in main cache memory 103 is rewritten. When necessary data is stored in subcache memory 105, the data is read out from subcache memory 105, and transferred to main cache memory 103. In the write operation, the data in main cache memory 103 is rewritten. At this time, the data stored in subcache memory 105 may be ignored. This is because subcache memory 105 withdraws data to main memory 101 asynchronously, so that unused data is transferred to main memory 101 after a prescribed time. Even if data obtained by rewriting the data in subcache memory 105 later is registered in main cache memory 103, and the original data is transferred to main memory 101 for registration, the data in main memory 101 is not accessed unless data is transferred from main cache memory 103 to subcache memory 105. Therefore, no malfunction occurs.

Main memory 101 is formed of a volatile memory such as a DRAM. Since this memory must be refreshed for every predetermined time, an address at which the refresh is carried out and the timing must be applied to main memory 101. Asynchronous arbiter 215 determines priority between the address and an address transferred from subcache memory 105 or the like. Therefore, data is transferred to main memory 101 through asynchronous arbiter 215. Asynchronous arbiter 215 arbitrates among an AND signal of a miss signal output from main cache memory 103 and subcache memory 105, a data transfer trigger from subcache memory 105, and a refresh request signal from refresh controller 211 to activate main memory 101.

Although arbitration by asynchronous arbiter 215 often assigns the highest priority to the refresh request signal, access of main memory 101 at the time of miss may be given top priority in order to give top priority to the processing speed. When a cache hit ratio is relatively high, a sufficient refresh operation can be carried out after access of main memory 101 at the time of the miss. This is because a substantially long non-access time of main memory 101 by continuous hits can be expected.

Figure 3:
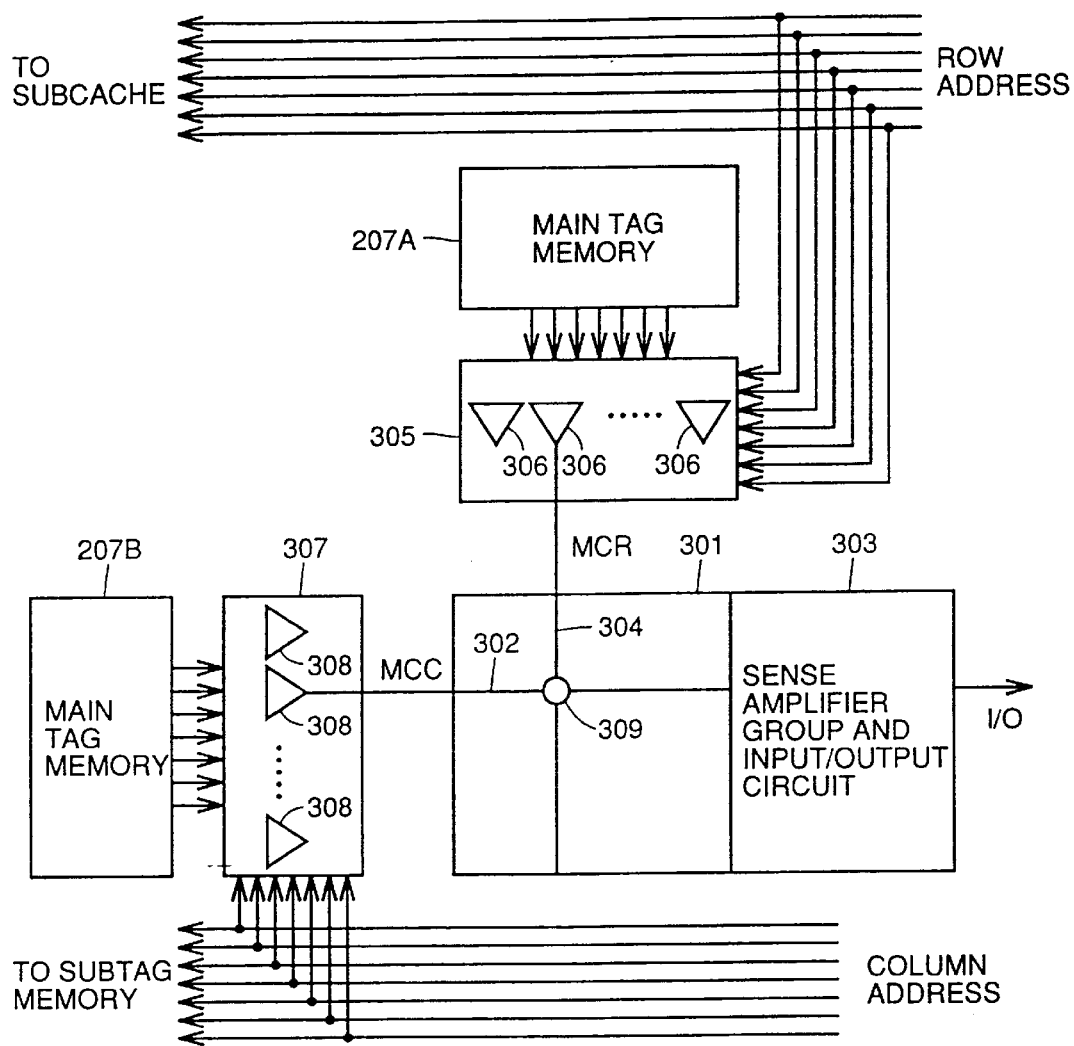
FIG. 3 is a block diagram showing a specific structure of a main cache memory and a main tag memory in FIG. 2.

Referring to FIG. 3, main cache memory 103 in FIG. 2 includes a memory cell array 301, a sense amplifier group and input/output circuit 303, a row decoder 305, and a column decoder 307. Memory cell array 301 includes a plurality of word lines (row select lines) 304, a plurality of column select lines 302 crossing word lines 304, and a plurality of memory cells 309 corresponding to crossing points between word lines 304 and column select lines 302. Row decoder 305 includes a plurality of comparing circuits 306 corresponding to word lines 304. Column decoder 307 includes a plurality of comparing circuits 308 corresponding to column select lines 302. Main tag memory 207 in FIG. 2 is divided into main tag memories 207A and 207B in FIG. 3.

In FIG. 3, a row address and a column address from address buffer 201 in FIG. 2 are supplied to row decoder 305 and column decoder 307, respectively.

In row decoder 305, each comparing circuit 306 compares the row address from address buffer 201 to an address stored in main tag memory 207A. Comparing circuit 306 detecting matching between the addresses supplies a match signal MCR to a corresponding word line 304. In response to this match signal MCR, all memory cells 309 connected to the word line 304 are selected. When data is read out from all the selected memory cells, provision of only comparing circuits 306 corresponding to word lines 304 is sufficient. However, in this embodiment, comparing circuits 308 are also provided corresponding to column select lines 302 so that data can be read out from a part of the selected memory cells.

In column decoder 307, each comparing circuit 308 compares the column address from address buffer 201 to an address stored in main tag memory 207B. Comparing circuit 308 detecting matching between the addresses supplies a match signal MCC to a corresponding column select line 302. In response to this match signal MCC, all memory cells 309 connected to the column select line 302 are selected.

As described above, since an output from comparing circuits 306 and 308 is directly connected to word line 304 or column select line 302, main cache memory 103 and main tag memory 207 are structured simply.

Subcache memory 105 and subtag memory 209 in FIG. 2 are structured similarly to main cache memory 103 and main tag memory 207 in FIG. 3.

Figure 4:
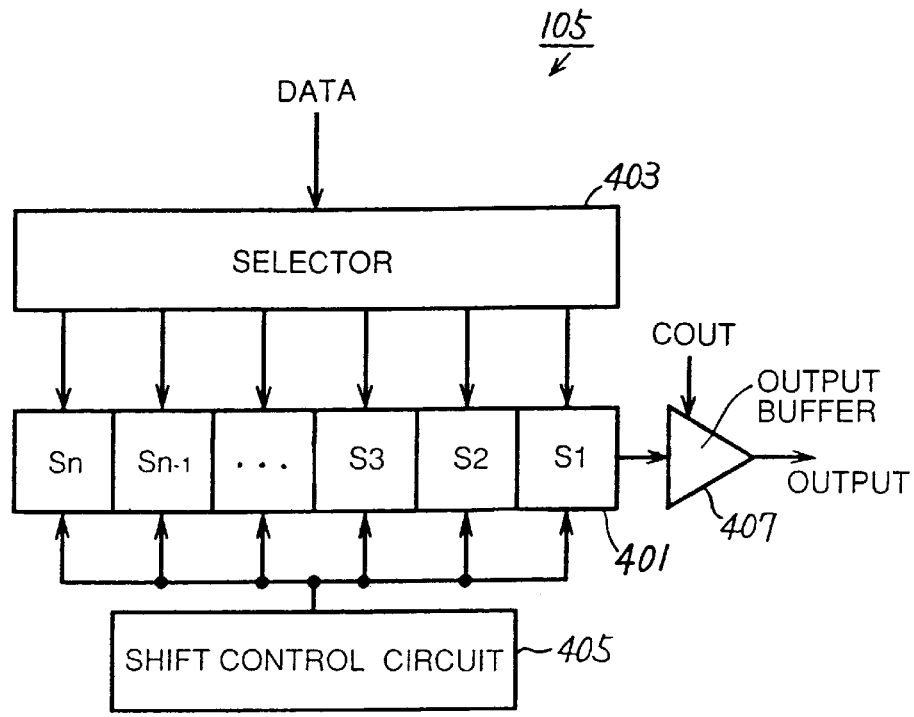
FIG. 4 is a block diagram showing a specific structure of a subcache memory in FIG. 2.

Referring to FIG. 4, subcache memory 105 includes a shift register 401 for storing data transferred from main cache memory 103 and its address, a selector 403 for receiving the data transferred from main cache memory 103 and the address and storing the data and the address in shift register 401, a shift control circuit 405 for controlling shift of the data and the address stored in shift register 401, and an output buffer 407 for supplying data output from shift register 401 to main memory 101. Shift register 401 includes register elements S1 to Sn.

In FIG. 4, shift register 401 outputs data in an input order. Here, the input to shift register 401 is data transferred from main cache memory 103 and an address associated therewith, and the output from shift register 401 is data to be transferred to main memory 101 and an address associated therewith.

Here, subcache memory 105 must once buffer data transferred from main cache memory 103 to transfer the data to main memory 101 while main memory 101 is in a ready state. Conventionally, data transferred from main cache memory 103 was immediately transferred to main memory 101. However, since the writing speed of main memory 101 is not so high, the data transferred from main cache memory 103 cannot sometimes be withdrawn to main memory 101 immediately. Therefore, subcache memory 105 buffers the data. Shift register 401 must be long to a certain extent.

However, if data transferred from main cache memory 103 is sequentially input to this long shift register 401 from an input portion and shifted to be finally withdrawn to main memory 101, transfer of the data to main memory 101 is delayed. In order to avoid this delay, data transferred from main cache memory 103 is input to selector 403, and input to an optimal register element. The optimal register element indicates a register element Si+1 immediately after a register element Si having already received data. For example, if there is no data transferred from main cache memory 103 in shift register 401, the first data is input to the head register element S1 which is the closest to the output side. If the head register element S1 to the third register element S3 have already received data transferred from main cache memory 103, the succeeding data is input to the fourth register element S4. Data arriving at the head register element S1 is transferred to main memory 101 by output buffer 407 in response to an output control signal COUT.

Chip select signal CS in FIG. 2 does not associate with the operation of main memory 101. Chip select signal CS serves as an activation signal for main cache memory 103 and subcache memory 105. Although chip select signal CS does not associate with data transfer between subcache memory 105 and main memory 101, this signal triggers comparison between an address stored in subcache memory 105 and an input address and reading of data from subcache memory 105.

Figure 5:
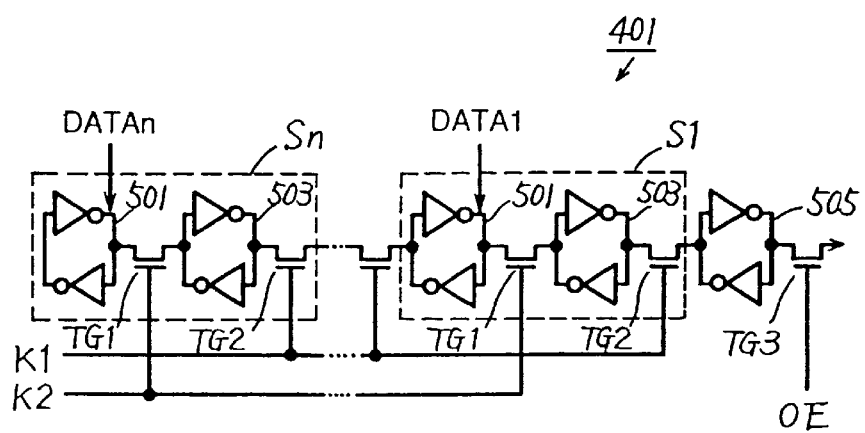
FIG. 5 is a circuit diagram of a shift register in FIG. 4.

Referring to FIG. 5, shift register 401 includes register elements S1 to Sn, a latch circuit 505 formed of two inverters, and a transfer gate TG3.

In register element S1, latch circuit 501 formed of two inverters is connected to one source/drain electrode of a transfer gate TG1. The other source/drain electrode of transfer gate TG1 is connected to another latch circuit 503 formed of two inverters. Latch circuit 503 is connected to one source/drain electrode of another transfer gate TG2. Register elements S2 to Sn have the same structure as register element S1. The register elements are connected in series to the side of latch circuit 501 in register element S1. The other source/drain electrode of transfer gate TG2 in register element S1 which is not connected to latch circuit 503 is connected to a latch circuit 505. Latch circuit 505 is connected to one source/drain electrode of a transfer gate TG3. The other source/drain electrode of transfer gate TG3 is connected to main memory 101. A shift signal K2 is applied to the gate electrode of transfer gate TG1, a shift signal K1 is applied to the gate electrode of transfer gate TG2, and an output clock OE is applied to the gate electrode of transfer gate TG3.

Assume that data is stored in latch circuits 501 in register elements S1 to Sn. When shift signal K2 attains a logical high or H level, transfer gate TG1 is turned on, and data stored in latch circuit 501 is shifted to latch circuit 503. When shift signal K1 attains the high level, transfer gate TG2 is turned on, and data stored in latch circuit 503 is shifted to latch circuit 501 in the register element which is closer to the output side. In the case of register element S1, data stored in latch circuit 503 is shifted to latch circuit 505. When an output enable signal OE attains the high level, transfer gate TG3 is turned on, and data stored in latch circuit 505 is output to main memory 101.

In FIG. 5, a shifter register of a general master/slave system is used for shift register 401. In response to externally applied low speed shift signals K1 and K2, input of data is controlled. When register elements S1 to Sn associate with the shift operation, selector 403 in FIG. 4 transfers input data to any of register elements S1 to Sn. When data is not stored in any register elements, data is applied to register elements S1, and the data is output to main memory 101 immediately. When data is stored in all register elements S1 to Sn, data is applied to register element Sn. The data is shifted according to the data transfer operation by the master/slave operation of low speed shift signals K1 and K2.

Figure 6:
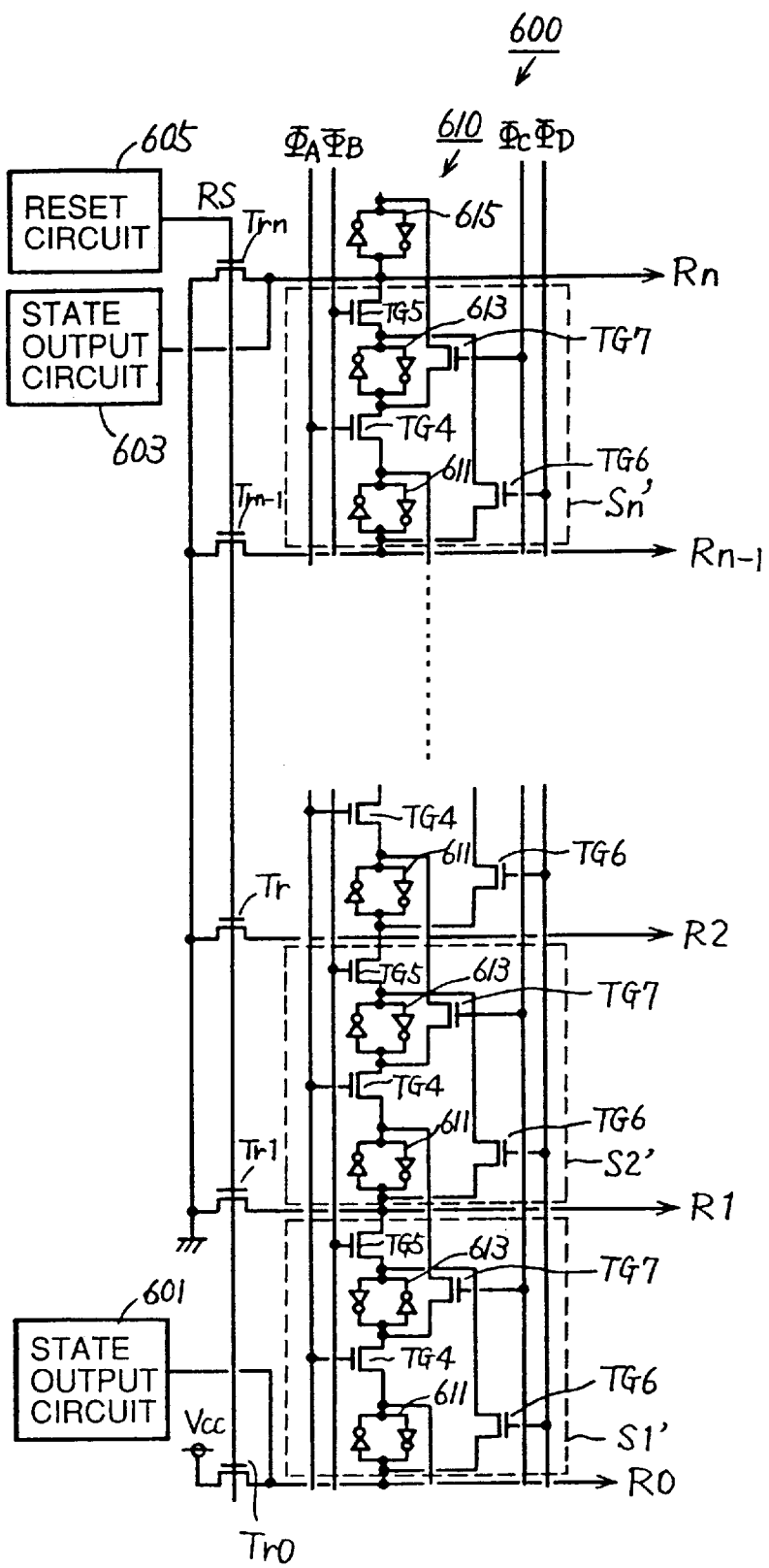
FIGS. 6 and 7 are circuit diagrams showing a structure of a selector in FIG. 4.
Figure 7:
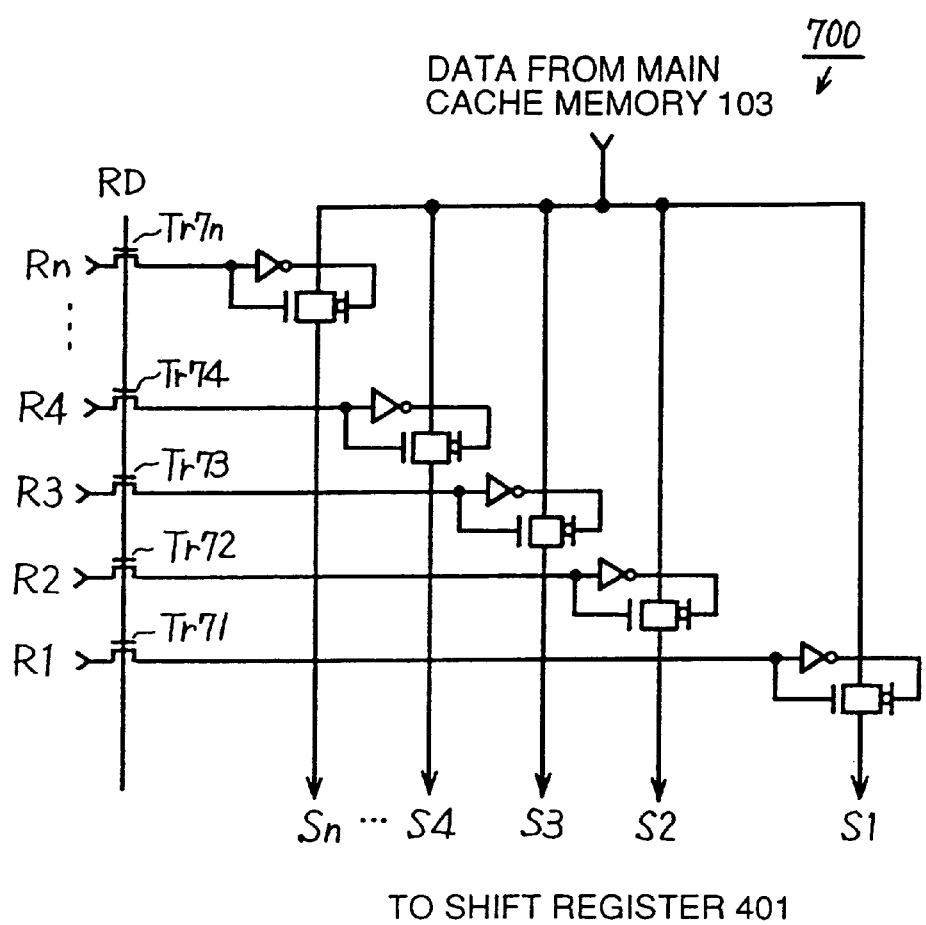

FIGS. 6 and 7 are circuit diagrams of selector 403 of FIG. 4. FIG. 6 shows a selecting circuit 600 for controlling a transfer gate group 700 in FIG. 7, and FIG. 7 shows transfer gate group 700 for transferring data from main cache memory 103 to shift register 401.

Referring to FIG. 6, selecting circuit 600 includes a bi-directional shift register 610, a state output circuit 601 indicating that all register elements S1' to Sn' included in bi-directional shift register 610 are empty, a state output circuit 603 indicating that register elements S1 to Sn included in shift register 401 all store data, a reset circuit 605 for resetting the levels of output nodes R0 to Rn connected to transfer gate group 700, a latch circuit 615, and NMOS transistors Tr0 to Trn.

In each of register elements S1' to Sn' of bi-directional shift register 610, the source/drain electrode of a transfer gate TG4 is connected to a latch circuit 611 formed of two inverters. Another latch circuit 613 formed of two inverters is connected to the other source/drain electrode of transfer gate TG4. The source/drain electrode of a transfer gate TG5 is connected to latch circuit 613. One source/drain electrode of a transfer gate TG6 is connected to latch circuit 611 at the side which is not connected to transfer gate TG4. The other source/drain electrode of transfer gate TG6 is connected to a connection node between latch circuit 613 and transfer gate TG5. One source/drain electrode of a transfer gate TG7 is connected to a connection node between transfer gate TG4 and latch circuit 613. The other source/drain electrode of transfer gate TG7 is connected to a connection node between latch circuit 611 of register element S2' and transfer gate TG4. Register elements S1' to Sn' are connected in series by output nodes R1 to Rn−1 to transfer gate group 700. Output node R0 is connected to latch circuit 611 of register element S1', and output node Rn is connected to transfer gate TG5 of register element Sn. Only in register element Sn', the source/drain electrode on the side not connected to latch circuit 613 of transfer gate TG5 is connected to latch circuit 615, and the source/drain electrode of transfer gate TG7 on the side not connected to the connection node between transfer gate TG4 and latch circuit 613 is connected to the side not connected to transfer gate TG5 of latch circuit 615.

The source electrode of NMOS transistor Tr0 is connected to output node R0. The drain electrodes of NMOS transistors Tr1 to Trn are connected to output nodes R1 to Rn. The drain electrode of NMOS transistor Tr0 is connected to a Vcc power source, and the source electrodes of NMOS transistors Tr1 to Trn are grounded. The gate electrodes of NMOS transistors Tr0 to Trn are connected to reset circuit 605. When a reset signal RS applied from reset circuit 605 attains the H level, NMOS transistors Tr0 to Trn are turned on, output node R0 attains the H level, and output nodes R1 to Rn attain the L level. This is a state where a counter is reset in the initial operation.

State output circuit 601 is further connected to output node R0. The H level of output node R0 indicates that register elements S1 to Sn of shift register 401 are all empty, and an output inhibit signal inhibiting output of data to main memory 101 is provided. On the other hand, state output circuit 603 is connected to output node Rn. The H level of output node Rn indicates that register elements S1 to Sn all store data, and an inhibit signal inhibiting reading of data from main cache memory 103 is provided. In response to input of a shift signal ΦA, transfer gate TG4 is turned on, and data stored in latch circuit 613 is shifted to latch circuit 611. In response to input of a shift signal ΦB, transfer gate TG5 is turned on, and data stored in latch circuit 611 of a register element at the succeeding stage is shifted to latch circuit 613 of a register element at the previous stage. On the contrary, in response to shift signal ΦD, transfer gate TG6 is turned on, and data stored in latch circuit 611 is shifted to latch circuit 613. In response to input of a shift signal ΦC, transfer gate TG7 is turned on, and data stored in latch circuit 613 of a register element at the previous stage is shifted to latch circuit 611 of a register element at the succeeding stage.

The H level of output node R0 in the initial operation indicates that the transfer gates of transfer gate group 700 (FIG. 7) are all turned off, and that data is not stored in shift register 401 (FIG. 5) which is a data transfer target. Then, whenever data is transferred to register elements S1 to Sn according to data transfer from a memory cell array of main cache memory 103, the H level sequentially moves to be shifted to output node R1, R2, R3, . . . . Therefore, the transfer gate which is turned on is sequentially moved. By this shift function, when data is transferred from main cache memory 103, a transfer gate corresponding to register element Si+1 immediately after register element S1 in which data is stored is always opened. Therefore, data input one after another are sequentially applied to the register elements.

Further, as shown in FIG. 5, data stored in shift register 401 is output by the alternate operation of shift signals K1 and K2. Associated with this, the position of the last register element in which data is stored is changed. This change in position is indicated by the output node at the H level of bi-directional shift register 610 in FIG. 6 being shifted in the opposite direction. Therefore, bi-directional shift register 610 stores a flag indicating a register element for storing data. Data in register elements S1' to Sn' corresponds to the flag.

When data is frequently transferred from a memory cell array of main cache memory 103, the amount of data sometimes exceeds the capacity of shift register 401. In this case, the H level of bi-directional shift register 610 is transferred to the uppermost output node Rn. Therefore, the overflow of shift register 401 is easily detected by state output circuit 603 detecting that output node Rn attains the H level. In this case, state output circuit 603 outputs externally an inhibit signal inhibiting strobe of data to suppress strobe of data until there is a room in the capacity of shift register 401.

In practice, data transfer to main memory 101 is carried out asynchronously with the other access. Therefore, if the hit ratio of main cache memory 103 is high to some extent, it is enough for shift register 401 to have a capacity of ten and several bits. If shift register 401 has such a capacity, the overflow as described above will scarcely occur even with the slow access of main memory 101.

Referring to FIG. 7, a path of data transferred from main cache memory 103 is shown. Output nodes R1 to Rn shown in FIG. 6 are connected to the drain electrodes of NMOS transistors Tr71 to 7n. The source electrode of each of NMOS transistors Tr71 to 7n is connected to a transfer gate formed of an inverter, an NMOS transistor, and a PMOS transistor. When a clock signal RD applied to the gate electrodes is at the H level, NMOS transistors Tr71 to 7n are turned on, and data from a memory cell array of main cache memory 103 is applied to a corresponding one of register elements S1 to Sn in shift register 401 through the transfer gate.

By any of output nodes R1 to Rn being selected, data is transferred to a corresponding one of register elements S1 to Sn of shift register 401 for input.

Figure 8:
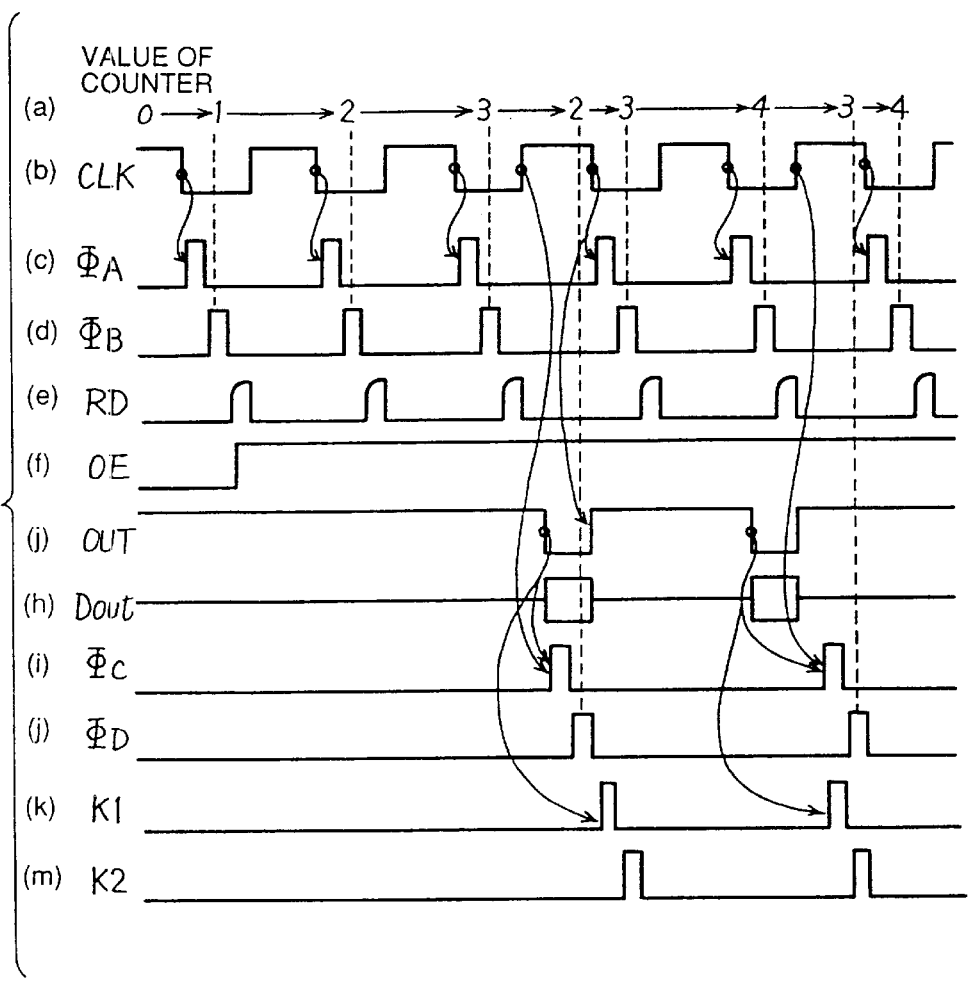
FIG. 8 is a timing chart showing operation of the cache DRAM according to the first embodiment.

FIG. 8 is a timing chart showing the operation of cache DRAM 100 of the first embodiment of the present invention.

The operation of cache DRAM 100 is triggered by an internally generated clock signal CLK. When clock signal CLK attains the L level, shift signals ΦA and ΦB operate to increment an H node of selector 403. When data is not stored in shift register 401 in the initial state, output is inhibited. More specifically, output enable signal OE is at the L level. After incrementing the H node of selector 403, data transferred from a memory cell array of main cache memory 103 is transferred to shift register 401 from selector 403 in response to clock signal RD. At this time, the data is stored in register element S1 of shift register 401. Accordingly, since data to be output is stored in shift register 401, output enable signal OE attains the H level.

Once clock signal CLK attains the H level, and again attains the L level, the value of a counter is set to 2. The value of the counter being 2 means that the register element number of shift register 401 to which data transferred from a memory cell array of main cache memory 103 is to be input next is 2. Similarly, the second next data is stored in register element S3. After that, when an output signal OUT attains the L level, and applied to output buffer 407, data stored in register element S1 is output externally (main memory) as an output signal Dout. As a result, storage data in shift register 401 is shifted by one stage, and the value of the counter is decremented by shift signals ΦC and ΦD to return to 2. When output is completed, the data is shifted in response to shift signals K1 and K2. By the next cycle of clock signal CLK, the register element number of shift register 401 to which data transferred from a memory cell array of main cache memory 103 is applied is 3.

(2) Second Embodiment

Figure 9:
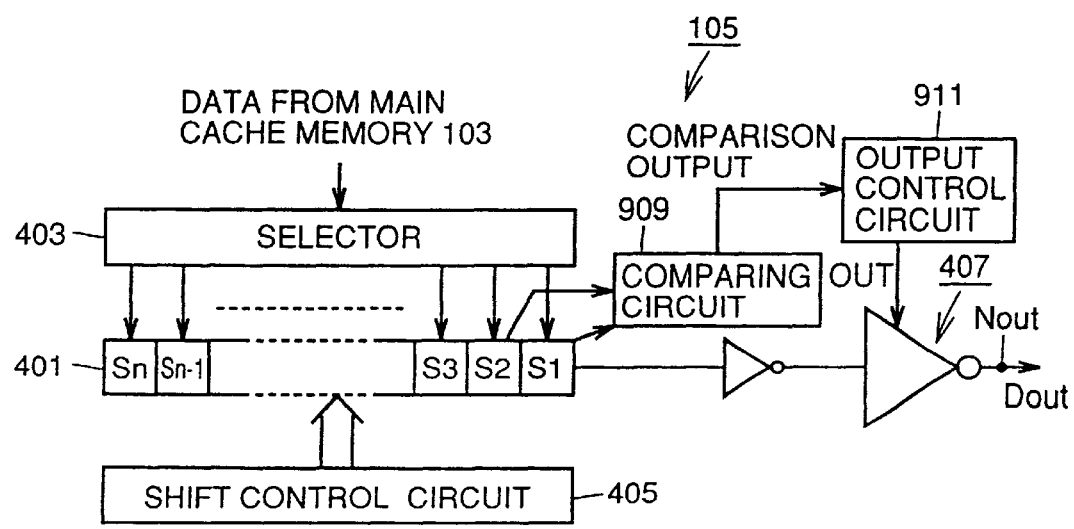
FIG. 9 is a block diagram showing a structure of a subcache memory of a cache DRAM according to a second embodiment of the present invention.

Referring to FIG. 9, subcache memory 105 includes shift register 401, selector 403, shift control circuit 405, output buffer 407, a comparing circuit 909, and an output control circuit 911.

In FIG. 9, connection and operation of shift register 401, selector 403, shift control circuit 405, and output buffer 407 are similar to those of FIG. 4. Comparing circuit 909 is connected to the head register element S1 and the next register element S2 of shift register 401, compares data stored in register element S1 and data stored in register element S2, and outputs a matching/mismatching signal. This operation can be carried out before output of data stored in register element S1. Output control circuit 911 is connected to comparing circuit 909, and controls the output function of output buffer 407 based on the comparison output. When data in register element S1 matches data in register element S2, for example, output buffer 407 holds an output line Nout at the same potential from output of data in register element S1 to output of data in register element S2. When data in register element S1 does not match data in register element S2, output buffer 407 once resets the output line Nout in a period from output of data in register element S1 to output of data in register element S2, to prepare for output of the next data which is at the opposite level.

Figure 10:
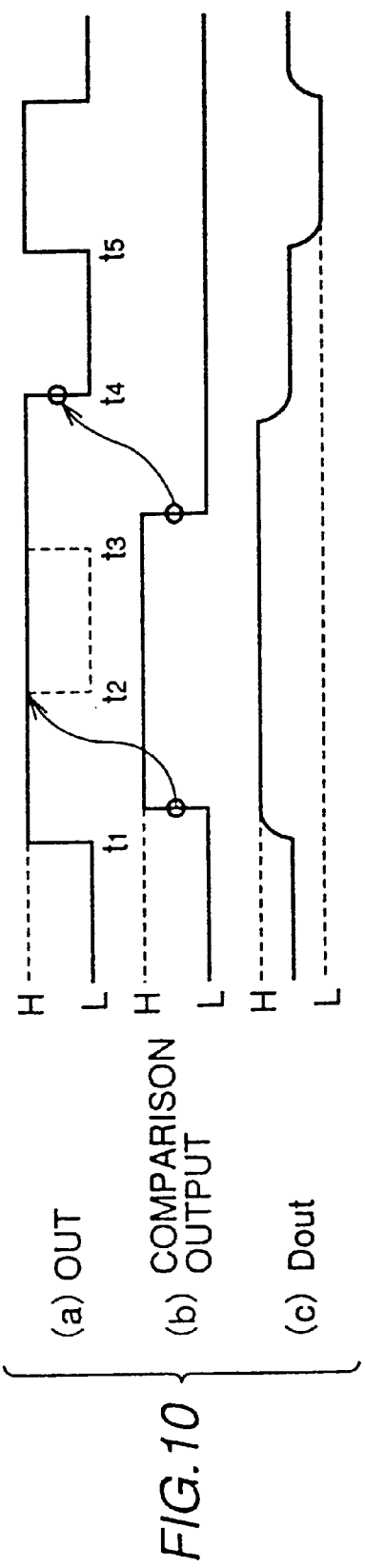
FIG. 10 is a timing chart showing operation of the subcache memory of FIG. 9.

Referring to FIG. 10, the basic operation of subcache memory 105 of FIG. 9 is the same as that of FIG. 8. In the case of continuous output, if data in register element S1 is equal to data in register element S2, output buffer 407 holds the previous output level without being deactivated between data outputs. When data in register element S1 is not equal to data in register element S2, output buffer 407 sets the level of the output line Nout at an intermediate potential to prepare for the next data output. As a result, high speed operation and low power consumption can be implemented.

(3) Third Embodiment

Figure 11:
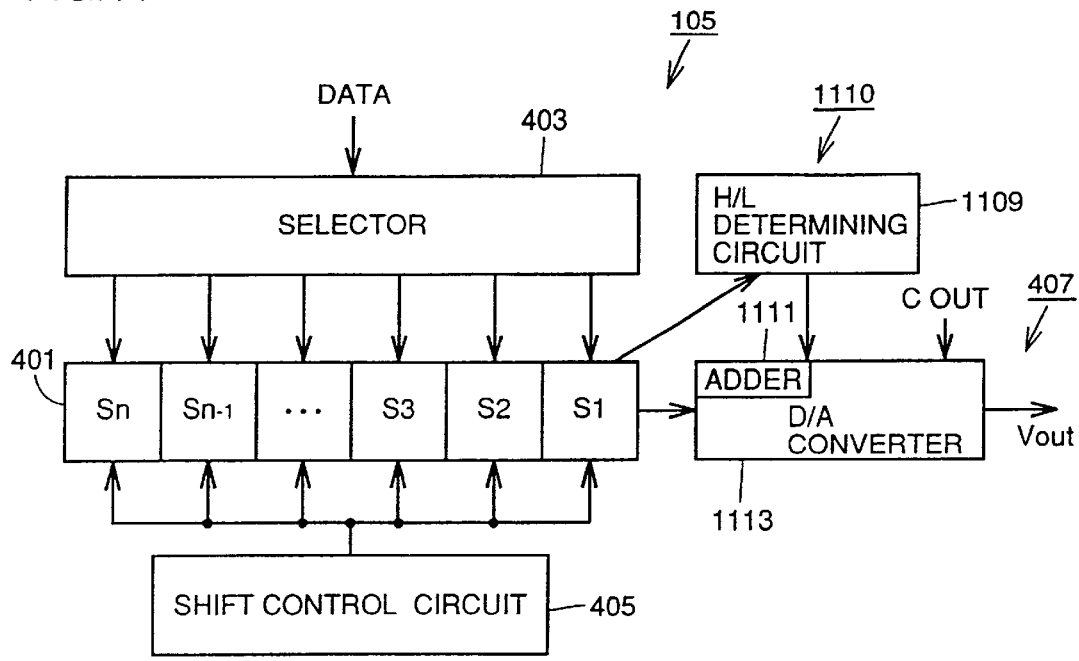
FIG. 11 is a block diagram showing a structure of a subcache memory of a cache DRAM according to a third embodiment of the present invention.

Referring to FIG. 11, subcache memory 105 includes shift register 401, selector 403, shift control circuit 405, and an output control circuit 1110. Output control circuit 1110 includes an H/L determining circuit 1109 and output buffer 407. Output buffer 407 includes an adder 1111 and a D/A converter 1113.

In FIG. 11, shift register 401, selector 403, and shift control circuit 405 are the same as those of FIG. 4 in structure and operation. H/L determining circuit 1109 determines whether data stored in the head register element S1 in shift register 401 is at the H level or the L level, and outputs "+1" or "−1" depending on the result. This operation can be carried out in advance before output of data stored in register element S1. Output buffer 407 including D/A converter 1113 and adder 1111 in output control circuit 1110 divides its operational potential width into a plurality of levels, and indicates its output level by any of the plurality of levels. More specifically, the next output level being higher or lower than the present output level is indicated by increase or decrease by one level obtained by division of the operational potential width. Adder 1111 is provided for this purpose. Adder 1111 adds "+1" to the present output level if the next output level is at the H level, and adds "−1" to the present output level if the next output level is at the L level.

Figure 12:
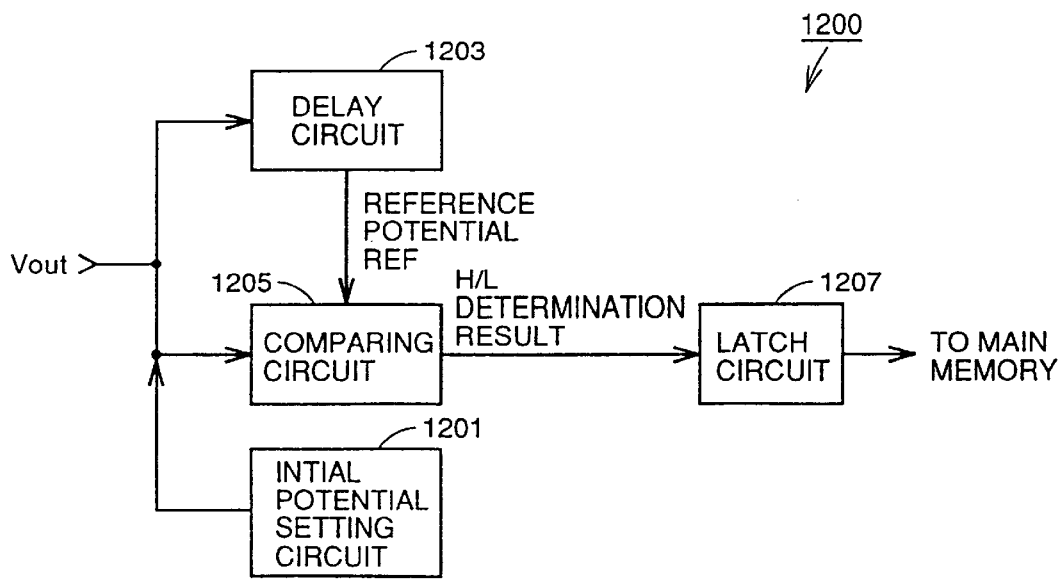
FIG. 12 is a block diagram showing a structure of a data decoding circuit receiving an output of a D/A converter in FIG. 11.

FIG. 12 is a diagram showing a structure of a data decoding circuit 1200 receiving output of subcache memory 105 of FIG. 11.

Referring to FIG. 12, data decoding circuit 1200 includes an initial potential setting circuit 1201 applying an initial potential to a signal line through which input data Din is transmitted, a delay circuit 1203 delaying input data Din, a comparing circuit 1205 comparing the previous data delayed by delay circuit 1203 and data to be input next, and a latch circuit 1207 latching data indicating the comparison result of comparing circuit 1205.

Referring to FIG. 12, data output from output buffer 407 of FIG. 11 is applied to delay circuit 1203 and comparing circuit 1205 as input data Din. Delay circuit 1203 and comparing circuit 1205 are connected to output buffer 407 of FIG. 11, and comparing circuit 1205 is connected to delay circuit 1203. Comparing circuit 1205 is further connected to latch circuit 1207.

Input data Din is transferred on a signal line which is set to a predetermined potential by initial potential setting circuit 1201 according to the operation of D/A converter 1113 of subcache memory 105 of FIG. 11. Input data Din is received by comparing circuit 1205. Since the level of the input data changes for every data, the level of the previous data is used as a reference of comparing circuit 1205. More specifically, when input data Din changes, comparing circuit 1205 compares the level of the input data to a reference potential REF. As the reference potential REF, comparing circuit 1205 uses the level of the previous data transferred through delay circuit 1203. The H/L determination result by this comparison can be latched to be used as an internal signal.

Figure 13:
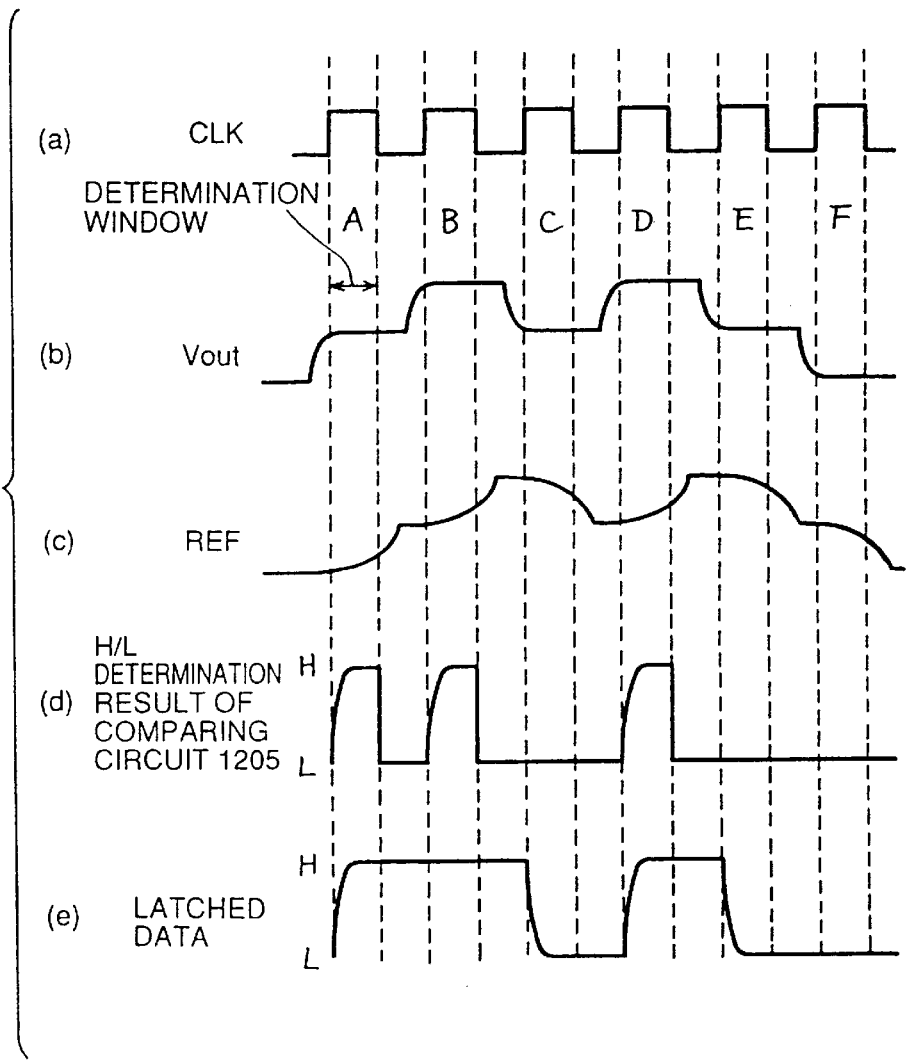
FIG. 13 is a timing chart showing operation of the subcache memory shown in FIGS. 11 and 12.

FIG. 13 is a timing chart showing the operation of subcache memory 105 and data decoding circuit 1200 of FIGS. 11 and 12.

When clock signal CLK attains the H level, the level of input data Din and the level of the previous data serving as the reference potential REF are compared. In a determination window A, the level of input data Din is higher than that of the previous data (reference potential REF), and the H/L determination result output from comparing circuit 1205 attains the H level. Therefore, latched data attains the H level. Similarly, in a determination window B, the level of input data Din is higher than that of the previous data (reference potential REF), the H/L determination result attains the H level, and the latched data holds the H level. In a determination window C, the level of input data Din is lower than that of the previous data (reference potential REF). The H/L determination result attains the L level, and the latched data attains the L level. In a determination window D, the level of input data Din is higher than that of the previous data (reference potential RF). Therefore, the H/L determination result attains the H level, and the latched data attains the H level again. In a determination window E, the level of input data Din is lower than that of the previous data (reference potential REF), the H/L determination result attains the L level, and the latch data attains the L level. In a determination window F, since the level of input data Din is lower than that of the previous data (reference potential REF), the H/L determination result attains the L level, and the latched data holds the L level.

(4) Fourth Embodiment

Figure 14:
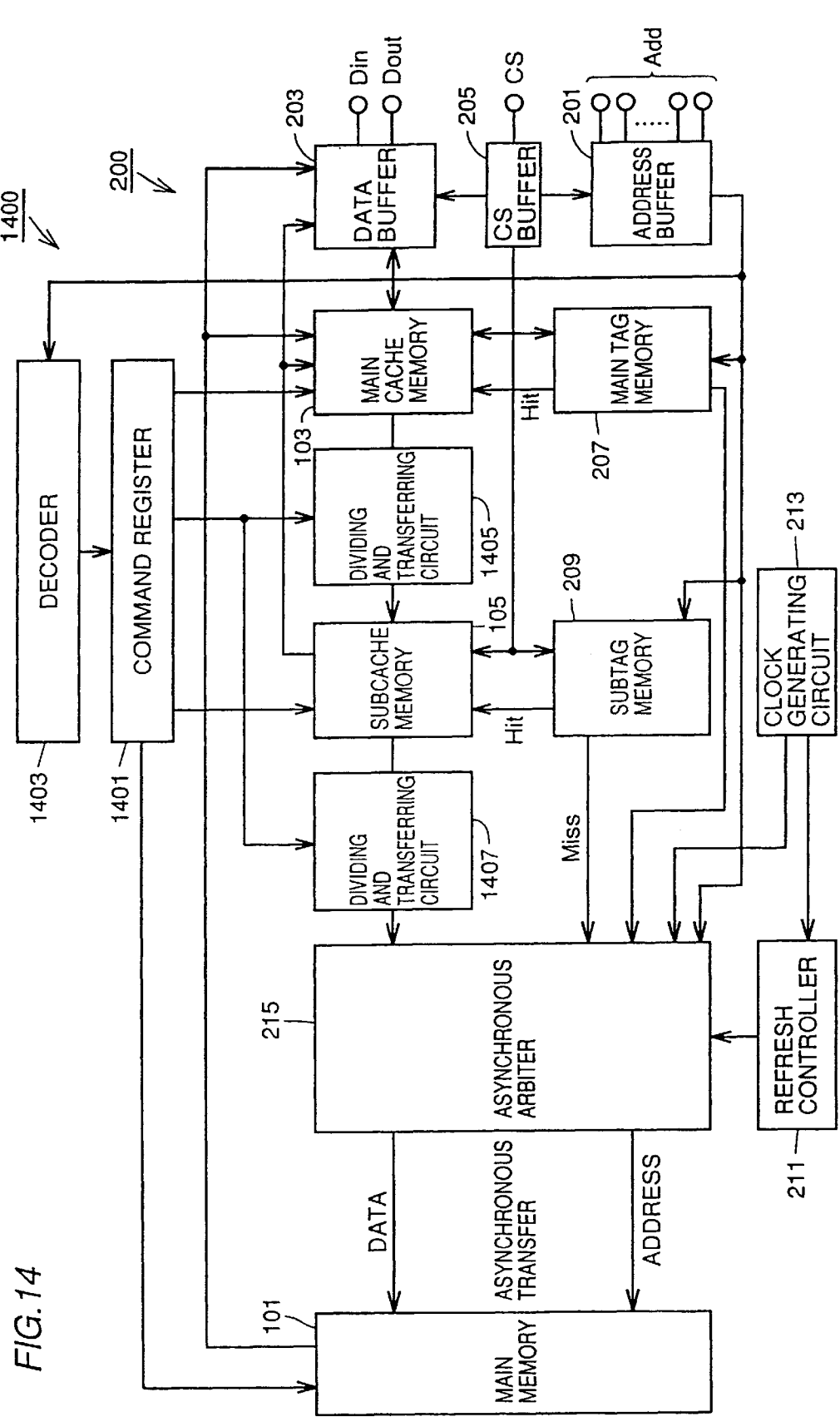
FIG. 14 is a block diagram showing a structure of a cache DRAM according to a fourth embodiment of the present invention.

Referring to FIG. 14, a cache DRAM 1400 according to the fourth embodiment of the present invention includes, in addition to the structure of FIG. 2, a command register 1401, a decoder 1403 generating a command by decoding an address signal externally supplied through address buffer 201, a dividing and transferring circuit 1405 dividing data supplied from main cache memory 103 and transferring the divided data to subcache memory 105, and a dividing and transferring circuit 1407 dividing data supplied from subcache memory 105 and transferring the divided data to main memory 101. Main memory 101 is divided into a plurality of blocks capable of the divisional operation.

An address supplied to address buffer 201 at a predetermined timing is supplied to decoder 1403. Decoder 1403 generates a command by decoding the supplied address, and supplies the command to command register 1401. The command generated by decoder 1403 is stored in command register 1401. Command register 1401 controls main memory 101 to carry out the divisional operation, and controls dividing and transferring circuits 1405 and 1407 to carry out the divisional operation.

Figure 15:
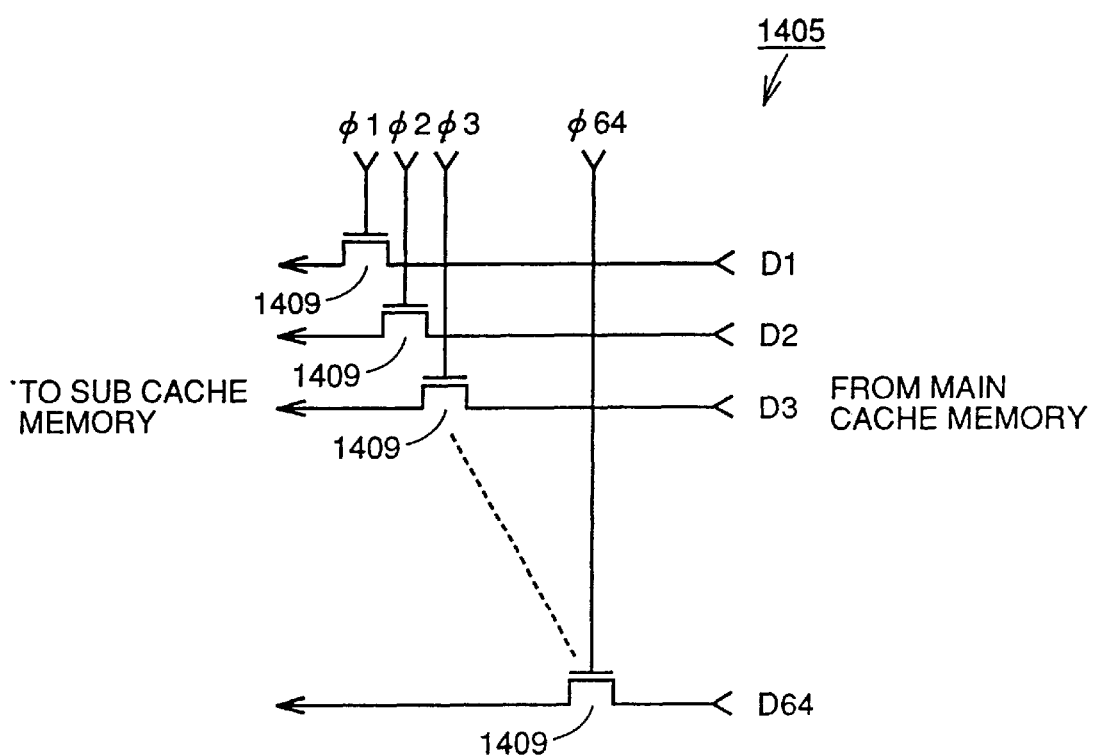
FIG. 15 is a circuit diagram showing a structure of a dividing and transferring circuit in FIG. 14.

Referring to FIG. 15, dividing and transferring circuit 1405 in FIG. 14 includes 64 transfer gates 1409. These transfer gates 1409 are supplied with divide and transfer signals $\phi 1$ to $\phi 64$ from command register 1401 at their gates. When divide and transfer signals $\phi 1$ to $\phi 64$ all at the H level are supplied simultaneously, dividing and transferring circuit 1405 does not divide data transfer. When divide and transfer signals $\phi 1$ to $\phi 2$ at the H level are supplied simultaneously at a timing, and divide and transfer signals $\phi 33$ to $\phi 64$ at the H level are supplied at another timing, for example, dividing and transferring circuit 1405 divides 64 data D1 to D64 into two, and sequentially transfers 32 data D1 to D32 and 32 data D33 to D64. Dividing and transferring circuit 1407 is structured similarly to dividing and transferring circuit 1405.

In cache DRAM 1400, by setting the number of division of a select line, for example, a word line, by command register 1401, the transfer bit width among main memory 101, main cache memory 103, and subcache memory 105 and an active region of the main memory can be set.

Decoder 1403 decodes a group of address signals input at a timing using an address input pin or the like, to change the group into an internal command. Decoder 1403 latches the internal command. The instruction of command register 1401 is to change the transfer bit width. Therefore, the address signals are applied to decoder 1403, and the internal command is latched by command register 1401. Command register 1401 can operate while maintaining the same transfer bit width. Further, when the state of data to be processed changes, and change of the transfer bit width contributes to increase of the data processing ability, the transfer bit width can be changed arbitrarily by rewriting of command register 1401.

Figure 16:
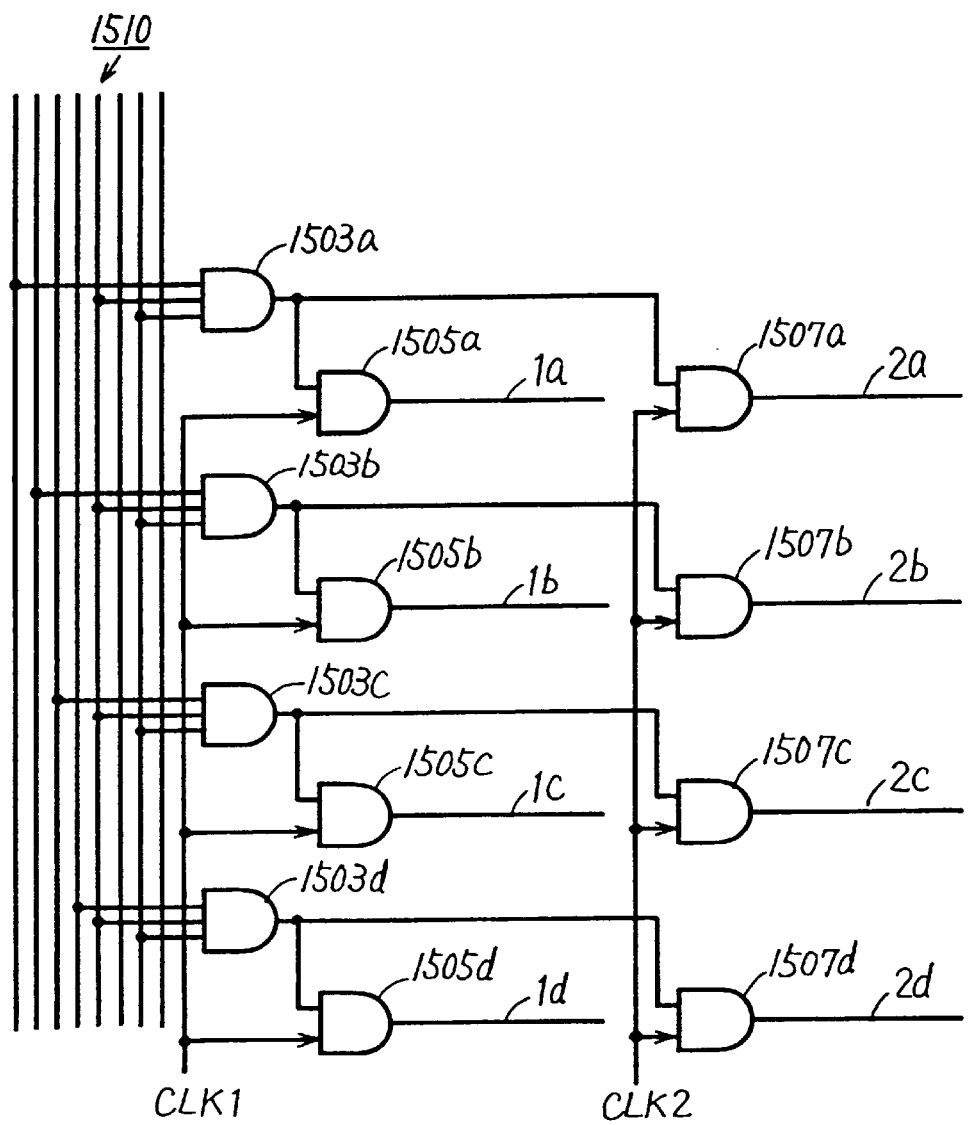
FIG. 16 is a block diagram showing a structure of a main memory in FIG. 14.

FIG. 16 shows a structure of a word line in main memory 101 suitable for cache DRAM 1400 of FIG. 14. In order to facilitate understanding, the word line is divided into two in FIG. 16. However, the number of division of the word line is arbitrary. Further, the numbers of decode lines and decoders are also arbitrary.

Word lines $1a$ to $1d$ and $2a$ to $2d$ are selected by activation of decoders $1503a$ to $1503d$ connected to an activated decode line by a combination of a plurality of decode lines 1510. Word lines $1a$ to $1d$ are connected to subdecoders $1505a$ to $1505d$ and word lines $2a$ to $2d$ are connected to subdecoders $1507a$ to $1507d$. A word line selected by decoders $1503a$ to $1503d$ and further driven by subdecoders $1505a$ to $1505d$ activated in response to a select clock CLK1 or subdecoders $1507a$ to $1507d$ activated in response to a select clock CLK2 is finally activated. Therefore, if activation control of select clocks CLK1 and CLK2 is carried out by command register 1401 in FIG. 14, the number of memories corresponding to the transfer bit width can be activated. If a command is registered so that both select clocks CLK1 and CLK2 should always be activated, for example, memory cells in a portion selected by both word lines $1a$ to $1d$ and $2a$ to $2d$ are activated. If a command is registered so that decoding is carried out at an address at which any one of select clocks CLK1 and CLK2 is applied, memory cells in a portion selected by any one of select clocks CLK1 and CLK2 are activated. As a result, an optimal transfer bit width can be set depending on the data width to be processed. Further, by changing the number of activated memories in main memory 101, power consumption can be decreased.

(5) Fifth Embodiment

Figure 17:
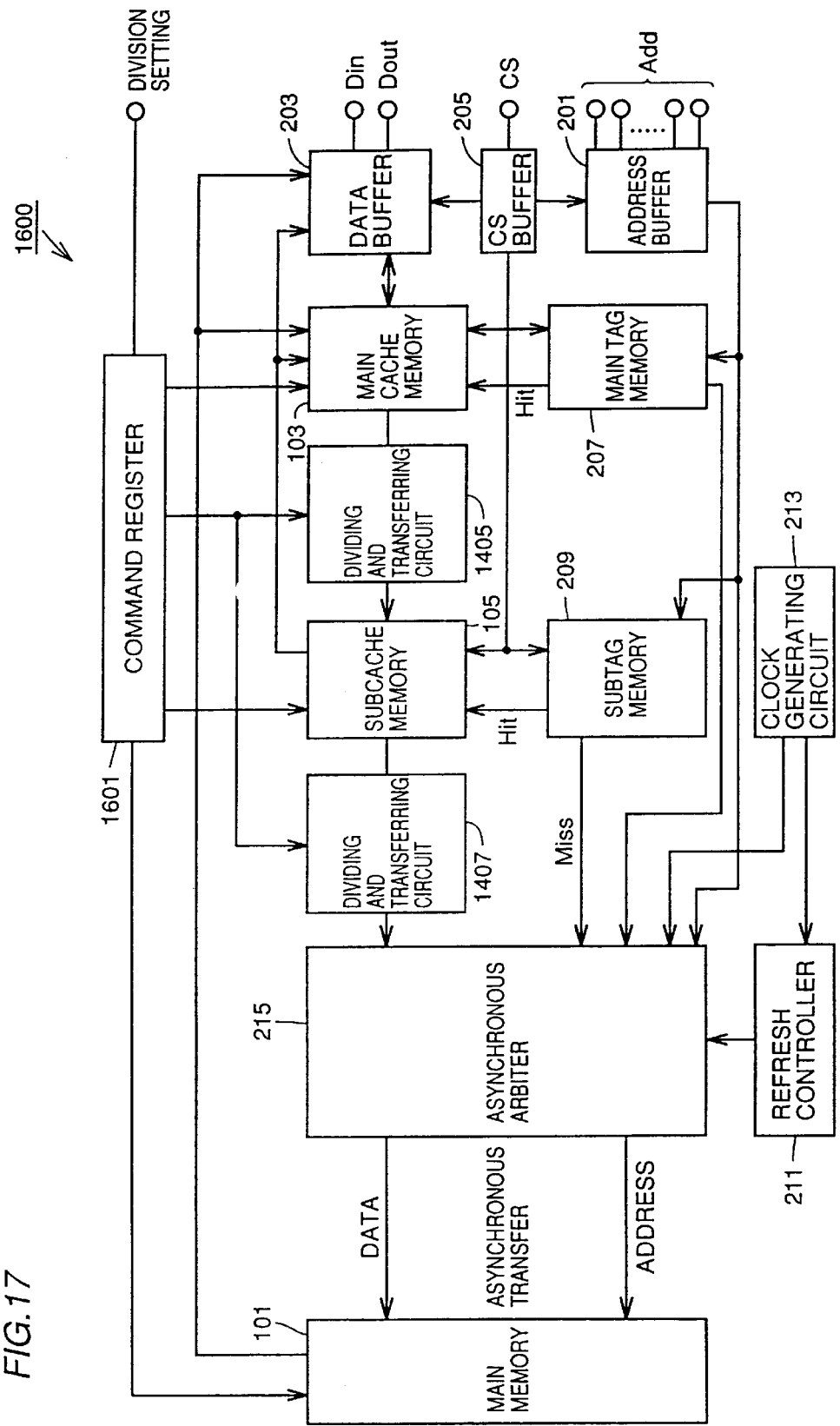
FIG. 17 is a block diagram showing a structure of a cache DRAM according to a fifth embodiment of the present invention.

Referring to FIG. 17, a cache DRAM 1600 includes dividing and transferring circuits 1405 and 1407 and a command register 1601, in addition to the structure of FIG. 2.

In FIG. 17, command register 1601 is connected to main memory 101, main cache memory 103, and subcache memory 105.

In cache DRAM 1600 in FIG. 7, by setting division by an input signal, the transfer bit width among main memory 101, main cache memory 103, and subcache memory 105 and an active region of main memory 101 can be divided.

A word line structure in main memory 101 suitable for this structure may be similar to that of FIG. 16. Activation control of select clocks CLK1 and CLK2 is carried out by an input signal, and memories of the number according to the transfer bit width are activated. For example, if a signal is input so that both select clocks CLK1 and CLK2 are always activated, memory cells in a portion selected by both word lines 1a to 1d and 2a to 2d are activated. If a signal is input so that decoding is carried out at an address at which any one of select clocks CLK1 and CLK2 is input, memory cells in a portion selected by any one of select clocks CLK1 and CLK2 are activated.

Figure 18:
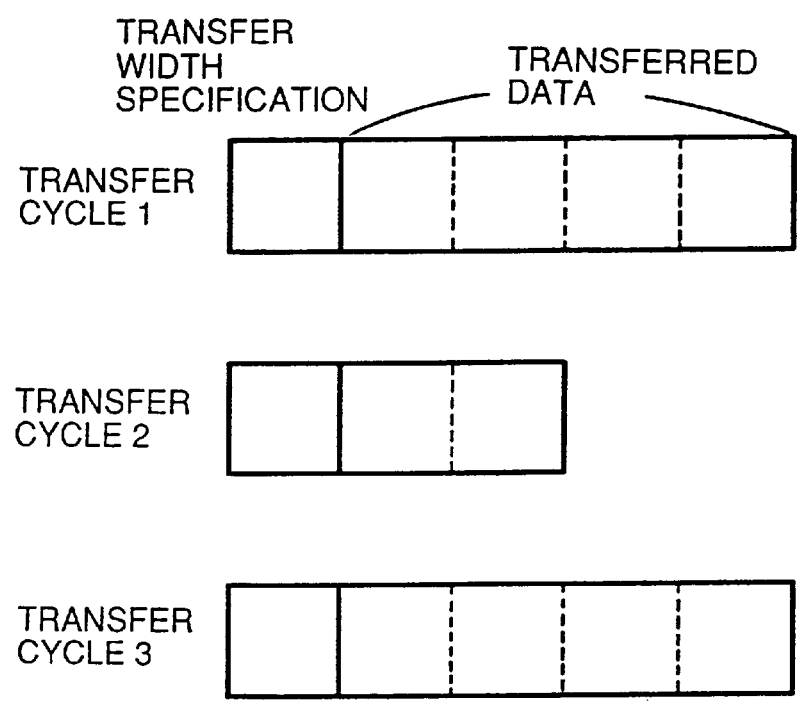
FIG. 18 is a diagram describing one example of data transfer by the cache DRAM of FIG. 17.

FIG. 18 is a diagram showing an example of a transfer cycle of a data packet.

The structure of cache DRAM 1600 of FIG. 17 is useful in the case where the bit width of data to be transferred changes over time according to information in a transfer width specifying packet, as in transfer cycles 1 to 3 shown in FIG. 18.

As described above, a command is registered in advance so that division setting can be carried out by a simple input signal. Therefore, by changing the optimal transfer bit width and the number of activated memory cells in main memory 101 depending on the width of data to be processed, low power consumption and optimization of the transfer bit width can be implemented more easily than the case of the fourth embodiment.

(6) Sixth Embodiment

Figure 19:
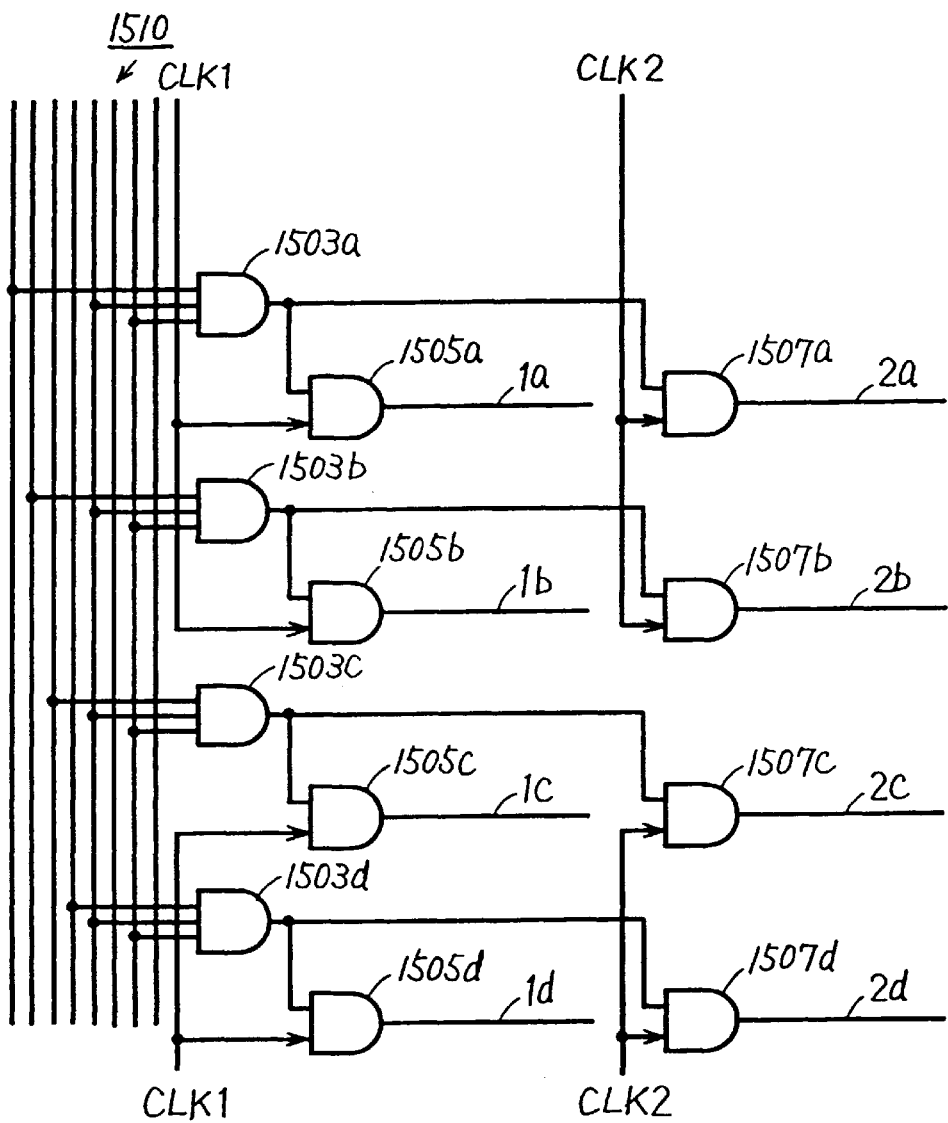
FIG. 19 is a block diagram showing a structure of a main memory of a cache DRAM according to a sixth embodiment of the present invention.
Figure 20:
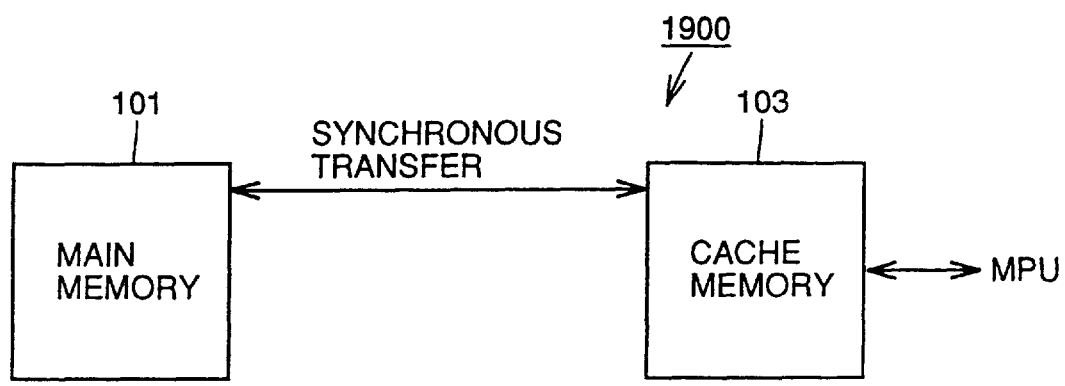
FIG. 20 is a concept diagram showing a structure of a conventional cache DRAM.
Figure 21:
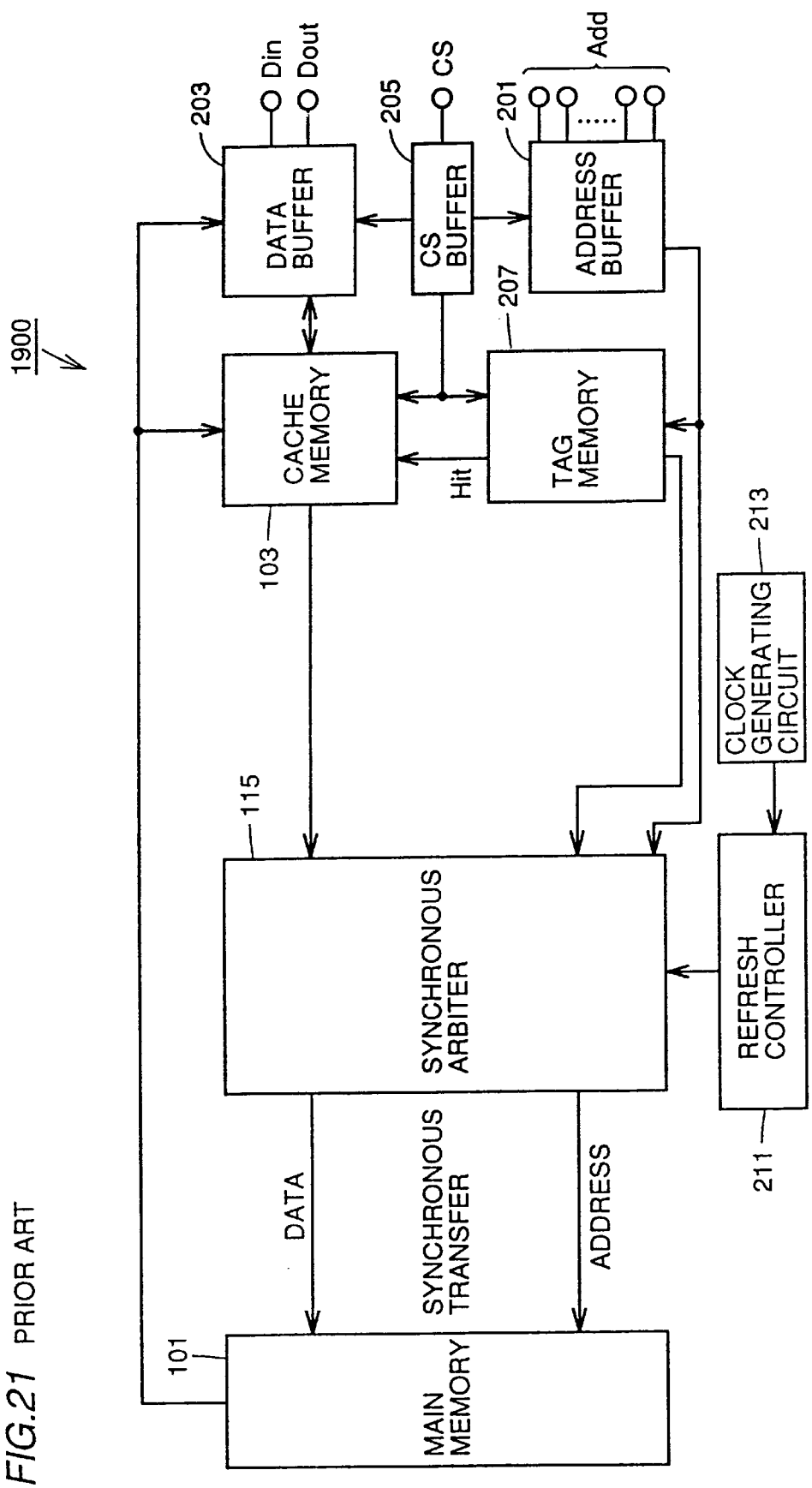
FIG. 21 is a block diagram showing a specific structure of the cache DRAM of FIG. 20.

FIG. 19 is a diagram showing another example of the structure of a word line in main memory 101 suitable for the structures of cache DRAMs 1400 and 1600 of FIGS. 14 and 17.

Referring to FIG. 19, this structure of a word line is obtained by dividing select clocks CLK1 and CLK2 into two or more in the structure of the word line shown in FIG. 16. This is for preventing increase in power consumption by increase in the memory capacity and the parasitic capacitance of select clocks CLK1 and CLK2 for selecting word lines 1a to 1d and 2a to 2d. As a result, the possibility of activation of word lines connected to unused decoders becomes smaller, making it possible to further decrease power consumption.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor device comprising:

an output buffer receiving an input signal and providing an output signal in synchronization with a clock signal;

an input buffer receiving as an input signal said output signal output from said output buffer in synchronization with the clock signal and providing an output signal;

a delay circuit delaying said input signal of said input buffer; and a circuit coupled to said delay circuit and defining a level of said output signal of said input buffer in accordance with a potential change of said input signal of said input buffer.

2. The semiconductor device according to claim 1, further comprising a control circuit coupled to said output buffer and increasing/decreasing a potential of said output signal from a previous potential of said output signal of said output buffer in response to said input signal of said output buffer.

3. The semiconductor device according to claim 2, wherein said output buffer has an operational potential width divided into a plurality of levels and selects one of said plurality of levels as the potential of said output signal of said output buffer; and said control circuit controls said output buffer to select the level higher or lower than the previously selected level.

4. The semiconductor device according to claim 3, wherein said control circuit determines whether said input signal of said output buffer is at a high level or a low level; and said output buffer includes a digital adder incrementing/decrementing in response to an output signal of said control circuit; and a digital to analog converter converting an output signal of said digital adder into said output signal of said output buffer.

5. The semiconductor device according to claim 2, wherein said output buffer changes the potential of said output signal of said output buffer among a power supply potential, a ground potential and a potential between the power supply potential and the ground potential in synchronization with the clock signal.

6. The semiconductor device according to claim 1, wherein said delay circuit changes a potential of the delayed input signal among a power supply potential, a ground potential and a potential between the power supply potential and the ground potential.

7. The semiconductor device according to claim 6, wherein said delay circuit sets the potential of the delayed input signal to a previous potential of said input signal of said input buffer.

8. A semiconductor device comprising:

an output buffer receiving an input signal and providing an output signal in synchronization with a clock signal;

an input buffer receiving as an input signal said output signal output from said output buffer in synchronization with the clock signal and providing an output signal;

a delay circuit delaying said input signal of said input buffer to generate a reference potential;

a circuit coupled to said delay circuit and comparing a potential of said input signal of said input buffer with the reference potential from said delay circuit to generate said output signal of said input buffer; and an initial potential setting circuit applying an initial potential as the reference potential.

* * * * *